United States Patent
Timmer

(10) Patent No.: US 9,422,182 B2
(45) Date of Patent: Aug. 23, 2016

(54) WATER PURIFIER SYSTEM AND A FILTER ELEMENT FOR SUCH SYSTEM

(75) Inventor: Johannes Petrus Timmer, Goningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1189 days.

(21) Appl. No.: 12/305,455

(22) PCT Filed: Jun. 22, 2007

(86) PCT No.: PCT/IB2007/052418
§ 371 (c)(1),
(2), (4) Date: Aug. 13, 2009

(87) PCT Pub. No.: WO2008/010116
PCT Pub. Date: Jan. 24, 2008

(65) Prior Publication Data
US 2009/0301975 A1    Dec. 10, 2009

(30) Foreign Application Priority Data
Jun. 27, 2006 (EP) .................................. 06116136

(51) Int. Cl.
*B01D 27/07* (2006.01)
*C02F 9/00* (2006.01)
*B01D 35/30* (2006.01)
*C02F 1/00* (2006.01)

(52) U.S. Cl.
CPC ............... *C02F 9/005* (2013.01); *B01D 35/30* (2013.01); *B01D 2201/302* (2013.01); *C02F 1/001* (2013.01); *C02F 2201/006* (2013.01)

(58) Field of Classification Search
CPC ......................................................... B01D 35/30
USPC .............. 210/232, 238, 244, 282, 433.1, 444, 210/446, 450
See application file for complete search history.

(56) References Cited

U.S. PATENT DOCUMENTS

| | | | | |
|---|---|---|---|---|
| 5,160,038 A | * | 11/1992 | Harada et al. ................. | 210/149 |
| 6,051,144 A | * | 4/2000 | Clack et al. .................... | 210/739 |
| 6,458,269 B1 | * | 10/2002 | Bassett et al. ................. | 210/119 |
| 6,776,906 B2 | | 8/2004 | Reid | |
| 6,780,316 B2 | * | 8/2004 | Haynes et al. ................ | 210/238 |
| 2003/0217958 A1 | * | 11/2003 | Reid ............................. | 210/232 |
| 2005/0098506 A1 | | 5/2005 | Bridges et al. | |
| 2006/0070942 A1 | | 4/2006 | An | |

FOREIGN PATENT DOCUMENTS

| | | |
|---|---|---|
| GB | 2312383 A | 10/1997 |
| JP | 2000126758 A | 5/2000 |
| JP | 2003103255 A | 4/2003 |
| WO | 03037479 A1 | 5/2003 |
| WO | 03070352 A1 | 8/2003 |
| WO | 2004041409 A1 | 5/2004 |

\* cited by examiner

*Primary Examiner* — Peter Keyworth

(57) ABSTRACT

A water purifier system includes a base unit and a filter unit detachably connected to the base unit. The base unit is provided with a water inlet tube for guiding water to the filter unit and with a water outlet tube for guiding purified water from the filter unit. The filter unit includes a container surrounding a replaceable filter element and covered by a removable lid. The container is provided with a water inlet member for guiding unfiltered water from the water inlet tube into the container. The replaceable filter element is provided with a water outlet member for guiding purified water from the filter element to the water outlet tube of the base unit. The water outlet member extends through an opening in the removable lid that covers the container.

11 Claims, 3 Drawing Sheets

WATER PURIFIER SYSTEM AND A FILTER ELEMENT FOR SUCH SYSTEM

The invention is related to a water purifier system comprising a base unit and a filter unit detachably connected to said base unit, whereby the base unit is provided with a water inlet tube for guiding water to the filter unit and with a water outlet tube for guiding purified water from the filter unit, and whereby the filter unit comprises a container surrounding a replaceable filter element, whereby the container is provided with a water inlet member for guiding unfiltered water from said water inlet tube into the container.

Reliable potable drinking water sources are scare, in particular in developing countries. High mortality rates can be caused by inadequate water purification. Cholera, typhoid, dysentery and rotavirus diarrhea are constant problems faced by people who are forced to make use of contaminated water. Lack of save water supplies perpetuates and aggravates the cycle of poverty and disease. Save drinking water can be produced by a water purifier system, whereby water is guided through a filter element containing a water purification medium such as a polymer having heterocyclic N-halamine moieties.

Such a water purifier system is disclosed in US-A-2005/0098506. This publication describes a gravity feed water filtration system, whereby untreated water is guided into the container comprising a filter element. Then, the water passes the filter element and leaves the container through openings in the lower part of the wall of the container. The container can be removed so that the filter element can be replaced.

In general, the pressure of the untreated water that enters the container is higher than the pressure of the purified water that leaves the container, because the pressure of the water decreases when the water passes the purification medium in the filter element. Such loss of pressure is small in a gravity feed water purifier system and can be high in a purifier system whereby the untreated water is supplied to the system under relative high pressure.

In the water purifier system as described above it is important to keep the untreated water and the purified water strictly separated. In particular in case the pressure of the untreated water is higher than the pressure of the purified water, the untreated water may leak to the purified water.

An object of the invention is a water purifier system comprising a base unit and an detachable filter unit comprising a container with a replaceable filter element, whereby the base unit is provided with a water inlet tube for guiding untreated water to the filter unit and with a water outlet tube for guiding purified water from the filter unit, whereby the risk of leakage of untreated water into the purified water is reduced.

To accomplish with the object, the replaceable filter element is provided with a water outlet member for guiding purified water from the filter element to the water outlet tube of the base unit, whereby said water outlet member extends through an opening in the wall of the container of the filter unit. By making the water outlet member a part of the replaceable filter element and by connecting that water outlet member directly to the water outlet tube of the base unit, the risk of contamination of the purified water is reduced. The only location where tubes of the purified water have to be disconnected and connected during the replacement operation of the filter element is outside the container at the interface between the base unit and the filter unit. Therefore, there is no sealing of the conduit-pipe for purified water at a location where it is surrounded by untreated water under pressure.

Furthermore, because the water outlet member is a part of the replaceable filter element, there will be no water supply to the water outlet tube of the base unit as long as there is no filter element in the container. Therefore, it is impossible that water is delivered by the water purifier system when the filter element is not present in the system.

In a preferred embodiment, the filter element has substantially a cylindrical shape, whereby the water outlet member extends in substantial axial direction at one end, and whereby one or more water inlet openings are present at the other end of the cylindrically shaped filter element. Also the container may have a cylindrical shape, whereby one and is closed and the other end can be closed by a removable lid that can be screwed on the container. Thereby, the water outlet member of the filter element can extend through an opening in said lid of the container. One or more O-rings may act as sealing means to prevent leakage of untreated water out of the container through said opening, but leakage of untreated water into the purified water is impossible.

Preferably, the water outlet member is irremovably connected with the replaceable filter element, so that it is not only unnecessary to remove the water outlet member from the filter element when replacing the filter element, but it is even impossible to do that. Thereby, the risk that the water purifier system is operated in a wrong manner is further reduced.

In a preferred embodiment, an end portion of the water inlet tube of the base unit is positioned parallel with an end portion of the water outlet tube of the base unit, whereby said end portion of the water inlet tube extends in a through-hole of the water inlet member of the container and whereby said end portion of the water outlet tube extends in a through-hole of the water outlet member of the filter element, and whereby the end portion of each of the two tubes is provided with a substantially radial directed water pass-through opening in its circumferential surface near the closed end of the respective tube. Of course, there may be more than one water pass-through opening in each of said end portions. Thereby, the removable filter unit can be easily connected with the base unit, whereby the water pressure in the water inlet tube and in the water outlet tube do not create a substantial force that may push the filter unit and the base unit away from each other. This will be further elucidated hereinafter, when an embodiment of the invention is described.

The invention is also related to a filter element for the water purifier system as described above, whereby the filter element is provided with a water outlet member for guiding purified water away from the filter, which water outlet member can extend through an opening of a container that surrounds the filter element and which water outlet member is provided with connection means for connecting the water outlet member with the end of a water outlet tube. Preferably, the water outlet member is irremovably attached to the filter element.

In a preferred embodiment, the water outlet member is provided with sealing means for cooperation with corresponding sealing means in the opening of the wall of the container in which the filter element can be located. Preferably, the filter element is substantially cylindrical, whereby the water outlet member extends in axial direction at one end of the filter element, and whereby one or more water inlet openings are present at the other end of the cylindrically shaped filter element.

Furthermore, the invention is related to a method for purifying water by means of a system comprising a base unit and a filter unit detachably connected to said base unit, whereby water is guided to the filter unit through a water inlet tube of the base unit and whereby purified water is guided from the filter unit through a water outlet tube of the base unit, and whereby the filter unit comprises a container surrounding a replaceable filter element, whereby unfiltered water is guided from said water inlet tube into the container through a water inlet member of the filter unit, and whereby purified water is guided from the replaceable filter element to the water outlet tube of the base unit through a water outlet member that is connected with the filter element and whereby said water outlet member extends through an opening in the wall of the container.

The invention will now be further elucidated by means of a description of an embodiment of a water purifier system comprising a base unit and a filter unit detachably connected to the base unit, whereby the filter unit comprises a container surrounding a replaceable filter element, and whereby reference is made to the drawing comprising three schematic figures, whereby:

Figure 1:
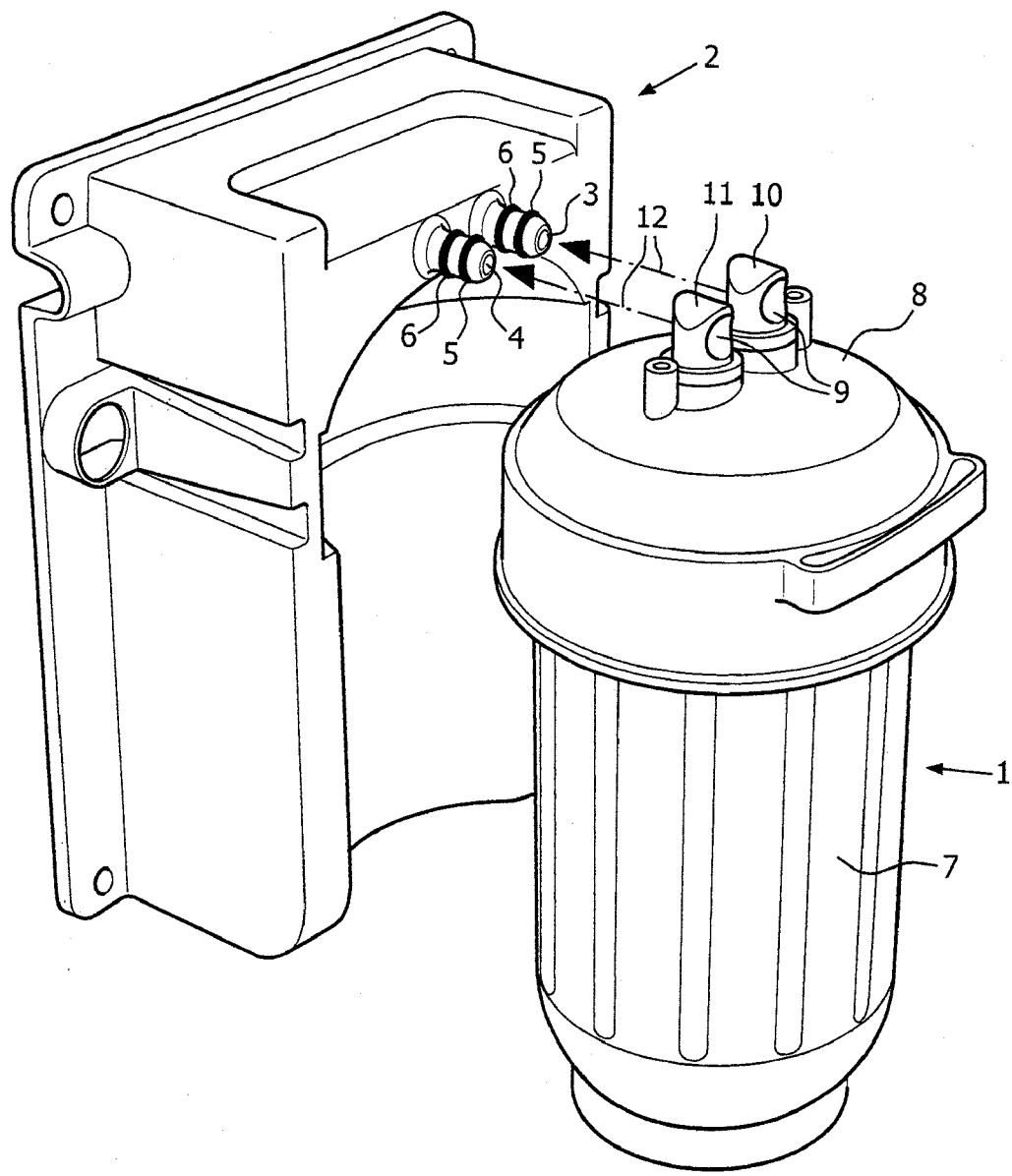
FIG. 1 is a perspective view of the water purifier system.

FIG. 1 shows the filter unit 1 of the water purifier system at some distance of the base unit 2 of the system. The base unit 2 is provided with a water inlet tube 3 and a water outlet tube 4 positioned parallel with respect to each other. The end of each tube 3,4 is closed and near the end of the tube, between the two O-rings 5,6, there is provided an water pass-through opening. Water inlet tube 3 is connected with a source for supplying water to be purified and water outlet tube 4 is connected with means for delivering purified water.

Filter unit 1 comprises a container 7 having a removable lid 8 that can be screwed to the lower part of the container 7. The lid 8 is provided with a water inlet member 10 to be connected with the water inlet tube 3 of the base unit 2. Furthermore, FIG. 1 shows water outlet member 11 extending through the lid 8, which water outlet member 11 can be connected with the water outlet tube 4 in order to guide purified water from the filter unit 1 to the base unit 2.

FIG. 1 shows with arrows 12 how the filter unit 1 can move towards the base unit 2 in order to connect the water inlet member 10 with the water inlet tube 3, and the water outlet member 11 with the water outlet tube 4. Thereby, the filter unit 1 can rest against the base unit 2, whereby further connection means can be present to keep the two units 1,2 together.

The water inlet member 10 and the water outlet member 11 of the filter unit 1 are provided with a through-hole 9 for accommodating the ends of the respective water tubes 3,4 of the base unit 2. The two O-rings 5,6 fit in the through-holes 9 in the water inlet member 10 and in the water outlet member 11 respectively. The two O-rings 5,6 may have the same diameter, but preferable the diameter of O-ring 5 is smaller than the diameter of O-ring 6, whereby the outer diameter of the water tube 3,4 near its end is smaller than the outer diameter at some more distance from the end. Of course, the diameters of the through-holes 9 in the water inlet member 10 and in the water outlet member 11 are accordingly varying, so that both O-rings 5,6 are an adequate sealing for the water guided to and from the filter unit 1.

Figure 2:
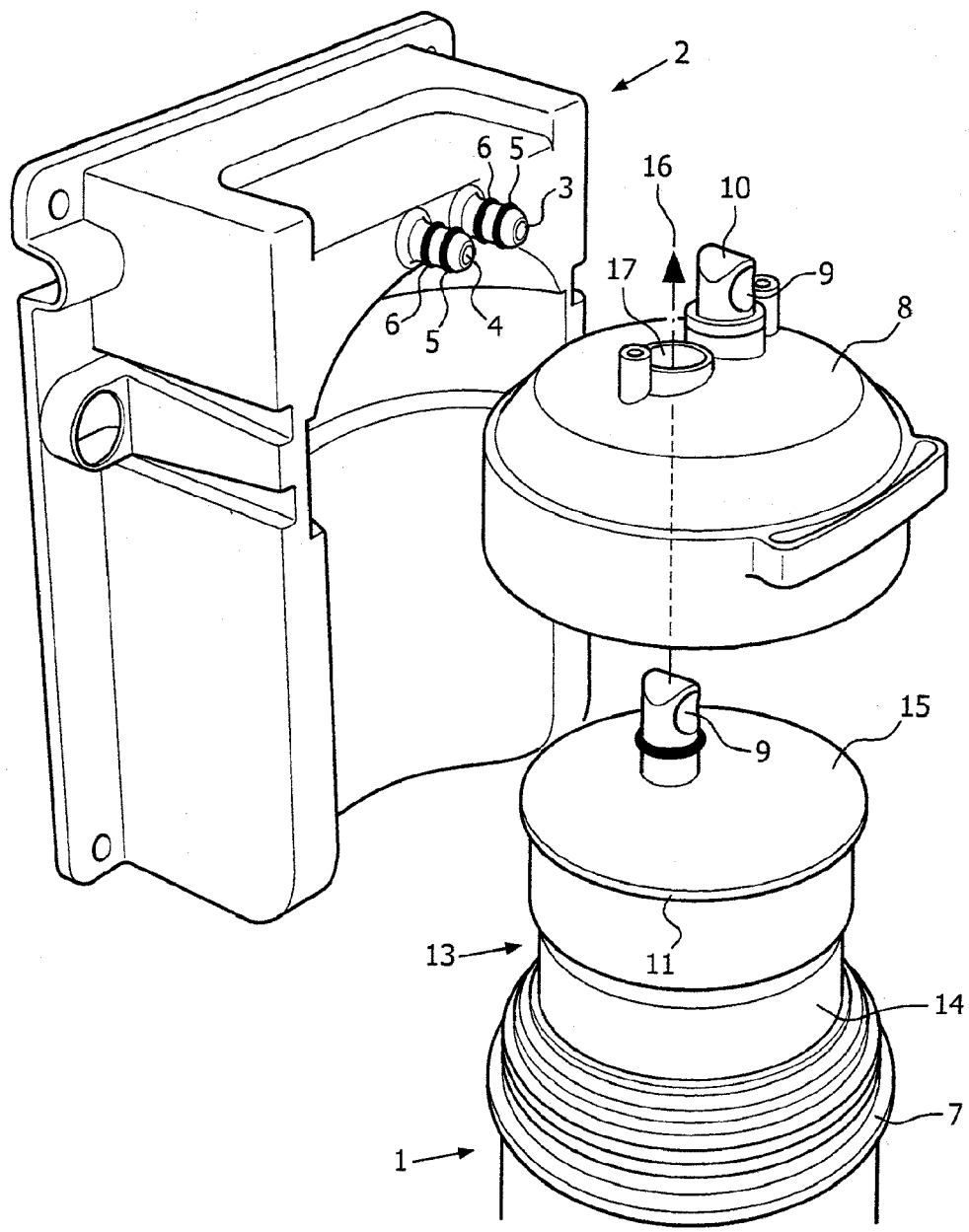
FIG. 2 is a perspective view whereby the filter element is shown.

FIG. 2 shows the container 7 in open position, whereby the lid 8 is removed from container 7, so that the filter element 13 is visible. The lid 8 can be connected to the container 7 by means of a screw-connection, or by any other detachable connection means. The filter element 13 comprises a cylindrical envelope 14, which is shown in FIG. 2 in a position somewhat lifted out of the container 7. The cylindrical envelope 14 contains the purification medium and is provided with a bottom at its lower end (in FIG. 2 inside the container 7). The other end of the cylindrical envelope 14 is closed by means of a cover member 15, which cover member 15 is irremovably connected with the cylindrical envelope 14, for example by means of a welding operation.

The lower end of the cylindrical envelope 14 is provided with openings, so that water can enter into the filter element 13 at its lower end. The cover member 15 is provided with water outlet member 11, through which member purified water can leave the filter element 13. As is indicated with arrow 16, the water outlet member 11 can be moved through an opening 17 in the cover member 15 of the filter element 13.

When the water purifier system is in operation, the untreated water enters through the water inlet tube 3 and the water inlet member 10 into the container 7. Then, the water enters through said openings in the lower end of the cylindrical envelope 14 into the filter element 13. The filtered water leaves the filter element 13 through the water outlet member 11 and the water outlet tube 4.

Figure 3:
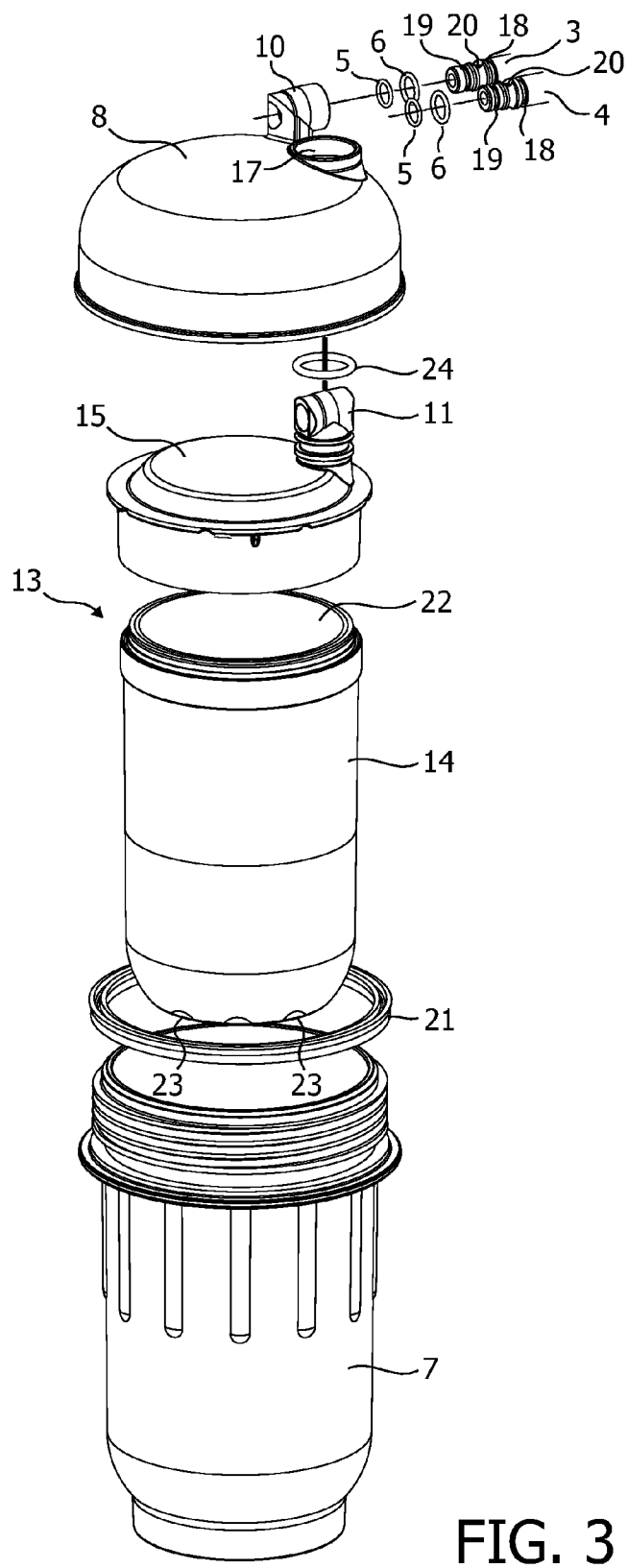
FIG. 3 is an exploded view of the system.

FIG. 3 is an exploded view of the water purifier system. The water inlet tube 3 and the water outlet tube 4, both being a portion of the base unit of the system, are positioned parallel with respect to each other. An O-ring 6 and an O-ring 5, having a smaller diameter than O-ring 6, can be placed around the water tubes 3,4 at the locations 18 and 19 respectively. Each water tube 3,4 has an opening 20 between these locations 18,19, through which opening 20 water can pass to and from the filter unit respectively.

Water inlet tube 3 can be connected with water inlet member 10 attached to the lid 8 of the container 7 of the filter unit. Lid 8 and container 7 can be screwed to each other, whereby a sealing ring 21 provides for a watertight connection. The filter element 13 containing a purification medium 22 can be accommodated inside the container 7. The filter element 13 comprises a cylindrical envelope 14 and a cover member 15 that can be welded to the envelope 14. The lower end of the cylindrical envelope 14 is provided with openings 23, so that water that is entered into the container 7 through the water inlet member 10 can enter into the filter element 13 at its lower side. The water can leave the filter element 13 through water outlet member 11 attached to the cover member 15 of the filter element 13, which outlet member extends through an opening 17 in the cover member 15. O-ring 24 provides thereby for a watertight sealing. Outlet member 11 can be connected to water outlet tube 4 of the base unit of the water purifier system.

The embodiment of a water purifier system as described above is only an example; many other embodiments are possible.

The invention claimed is:

1. A water purifier system comprising:
a base unit; and
a filter unit detachably connected to said base unit,
wherein the base unit includes a water inlet tube for guiding water to the filter unit and a water outlet tube for guiding purified water from the filter unit,
wherein the filter unit comprises a container surrounding a replaceable filter element,
wherein the container is removably covered by a removable lid, the removable lid having an opening and a water inlet member, the water inlet member being configured for guiding unfiltered water from said water inlet tube into the container,
wherein the replaceable filter element includes a water outlet member at a first end for guiding purified water from the replaceable filter element to said water outlet tube of the base unit thereby preventing water supply to the water outlet tube when the replaceable filter element is absent, said water outlet member of the replaceable filter element extending out of the container beyond the removable lid through the opening in the removable lid that removably covers the container, wherein said water outlet member of the replaceable filter element connects to the water outlet tube outside the container, wherein at least one member of the water inlet member and the water outlet member has a through-hole with two open ends for receiving one tube of the water inlet tube and the water outlet tube through one of the two open ends, and wherein the one tube of the base unit has a closed end and a radial directed water pass-through opening between two seals configured to sealingly fit in the through-hole with the two open ends.

2. The water purifier system as claimed in claim 1, wherein the replaceable filter element has substantially a cylindrical shape, wherein the water outlet member extends in substantial axial direction at the first end.

3. The water purifier system as claimed in claim 1, wherein the water outlet member is irremovably connected with the replaceable filter element.

4. The water purifier system as claimed in claim 1, wherein the water outlet member extends through an opening of the container that surrounds the replaceable filter element and wherein the water outlet member is provided with a connector for connecting the water outlet member with the water outlet tube.

5. The water purifier system as claimed in claim 4, wherein the water outlet member is irremovably attached to the replaceable filter element.

6. The water purifier system as claimed in claim 4, wherein the replaceable filter element is substantially cylindrical, wherein the water outlet member extends in axial direction at the first end of the replaceable filter element.

7. The water purifier system as claimed in claim 1, wherein the water outlet member is provided with a seal for cooperation with a corresponding seal in the opening of the removable lid.

8. The water purifier system of claim 1, wherein the replaceable filter element has a plurality of water inlet openings at a second end of the replaceable filter element, the second end being opposite the first end.

9. The water purifier system of claim 8, wherein the replaceable filter element further comprises a cover member opposite an envelope of the replaceable filter element, the cover member comprising the water outlet member and being irremovably connected with the envelope.

10. The water purifier system of claim 1, wherein a first seal of the two seals is near the closed end of the one tube of the base unit, and a second seal of the two seals is further away from the closed end than the first seal, and wherein the first seal has a smaller diameter than a diameter of the second seal.

11. The water purifier system of claim 10, wherein the through-hole with the two open ends has a varying size being larger at a receiving side that receives the one tube of the base unit and smaller at a further side opposite the receiving side.

* * * * *